United States Patent [19]

Rossmann

[11] Patent Number: 4,470,211
[45] Date of Patent: Sep. 11, 1984

[54] THRUST COUPLING FOR A VEHICLE

[76] Inventor: Michael Rossmann, Zugspitzstrasse 52½, 8035 Gauting, near Munich, Fed. Rep. of Germany

[21] Appl. No.: 449,182

[22] Filed: Dec. 13, 1982

[30] Foreign Application Priority Data

Dec. 14, 1981 [DE] Fed. Rep. of Germany ....... 3149436

[51] Int. Cl.$^3$ .............................................. E01H 5/04
[52] U.S. Cl. ...................................... 37/231; 280/511
[58] Field of Search .......................... 37/231, 235–236, 37/283; 280/504, 511, 477, 481, 482, 478 R, 478 A, 727, 760, 186

[56] References Cited

U.S. PATENT DOCUMENTS

| | | | |
|---|---|---|---|
| 2,163,279 | 6/1939 | Henry et al. | 37/231 |
| 2,606,417 | 8/1952 | Richey | 280/481 X |
| 2,635,891 | 4/1953 | Cook | 280/511 X |
| 2,752,747 | 7/1956 | Olsen | 280/495 X |
| 3,215,448 | 11/1965 | Anderson | 280/481 |
| 3,588,145 | 6/1971 | Thompson | 280/495 |
| 3,688,847 | 9/1972 | Deeter | 37/231 X |
| 3,851,894 | 12/1974 | Pierre | 37/231 |
| 4,273,352 | 6/1981 | Jorgenson | 280/481 |
| 4,342,163 | 8/1982 | Hoekstra | 280/495 X |

Primary Examiner—S. H. Eickholt
Attorney, Agent, or Firm—Kenyon & Kenyon

[57] ABSTRACT

The thrust coupling has a thrust frame which can be readily coupled to the underside of a vehicle. The thrust frame is pivotally mounted on a hitching device on the rear of the vehicle and is suspended at the front of the vehicle via chains. In addition, an adjustable guide rod is provided to effect centering of the thrust frame at the front of the vehicle. The thrust frame can be raised and lowered at the front end of the vehicle via the chains and can be laterally centered via the guide rod. Vertical motion of the thrust frame at the front end can be effected from the driver's seat.

20 Claims, 6 Drawing Figures

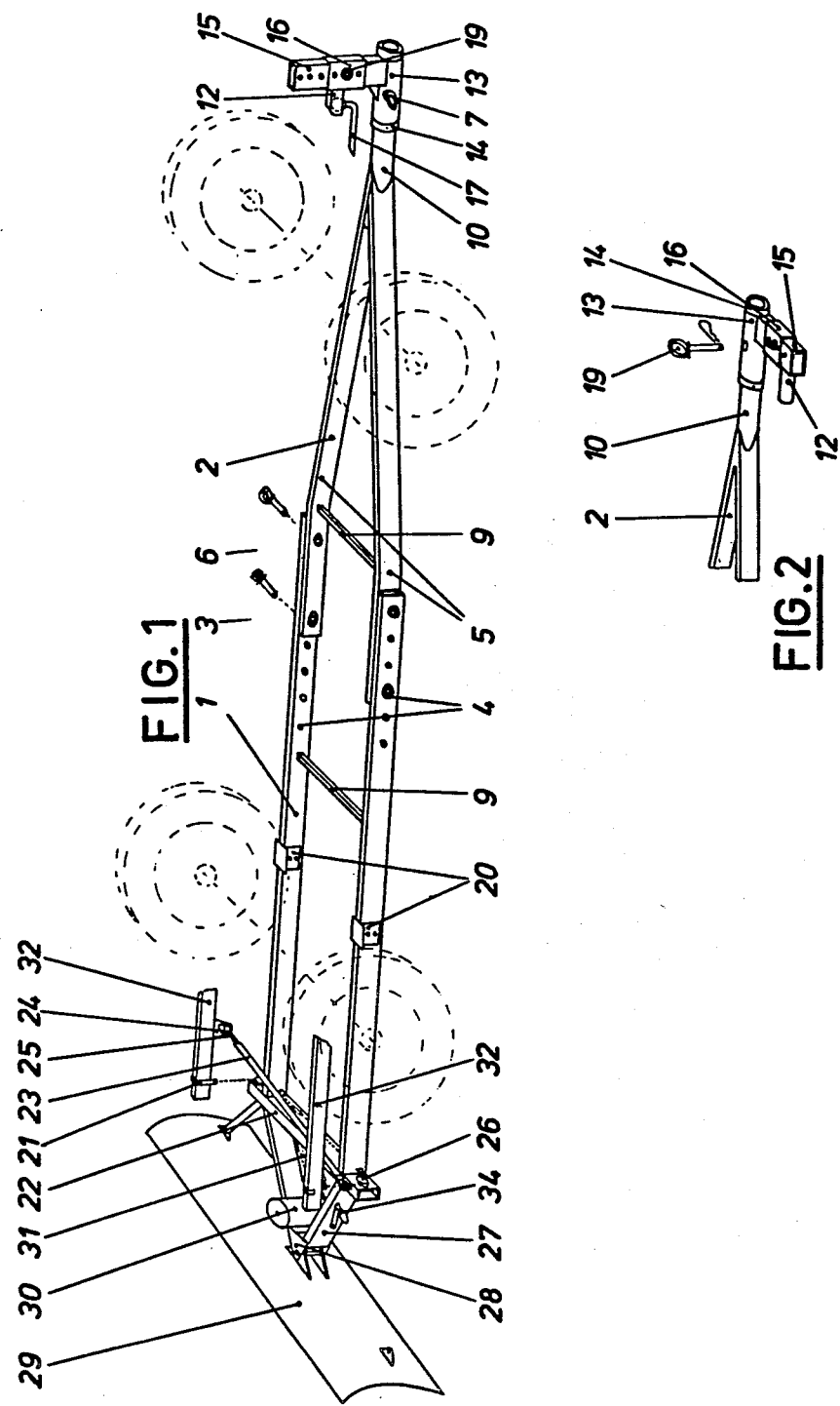

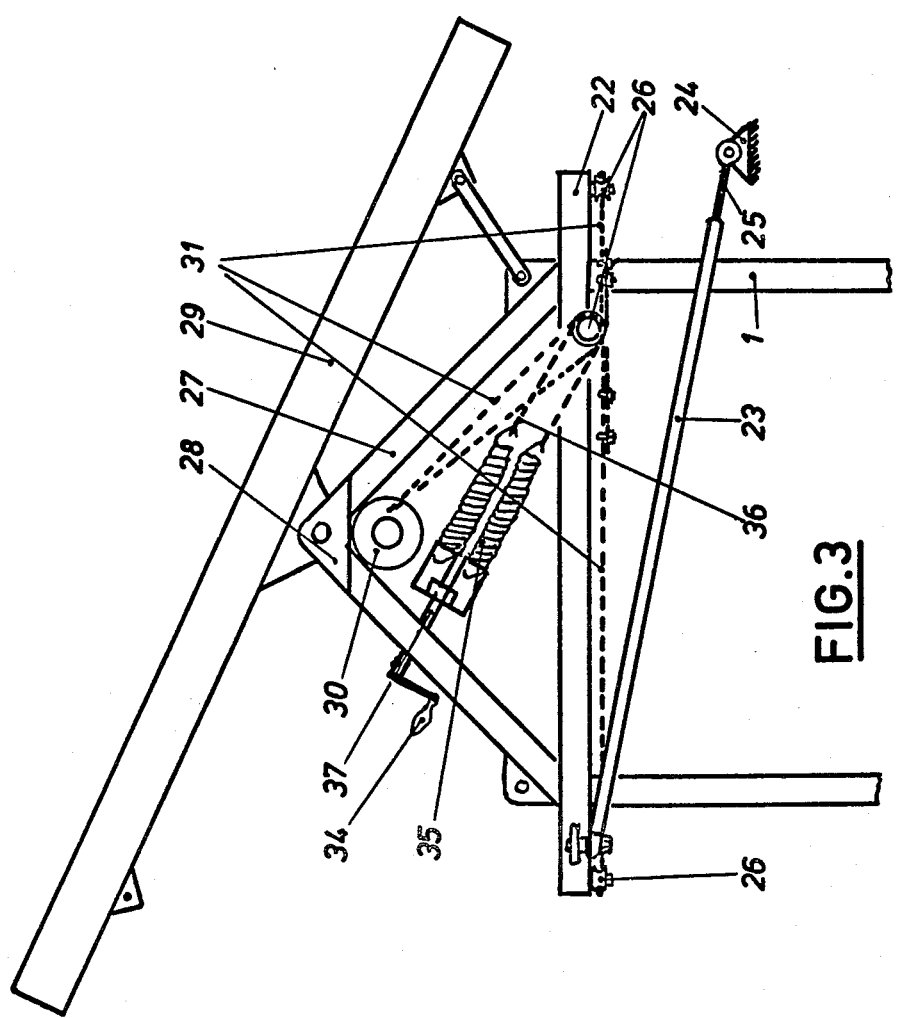

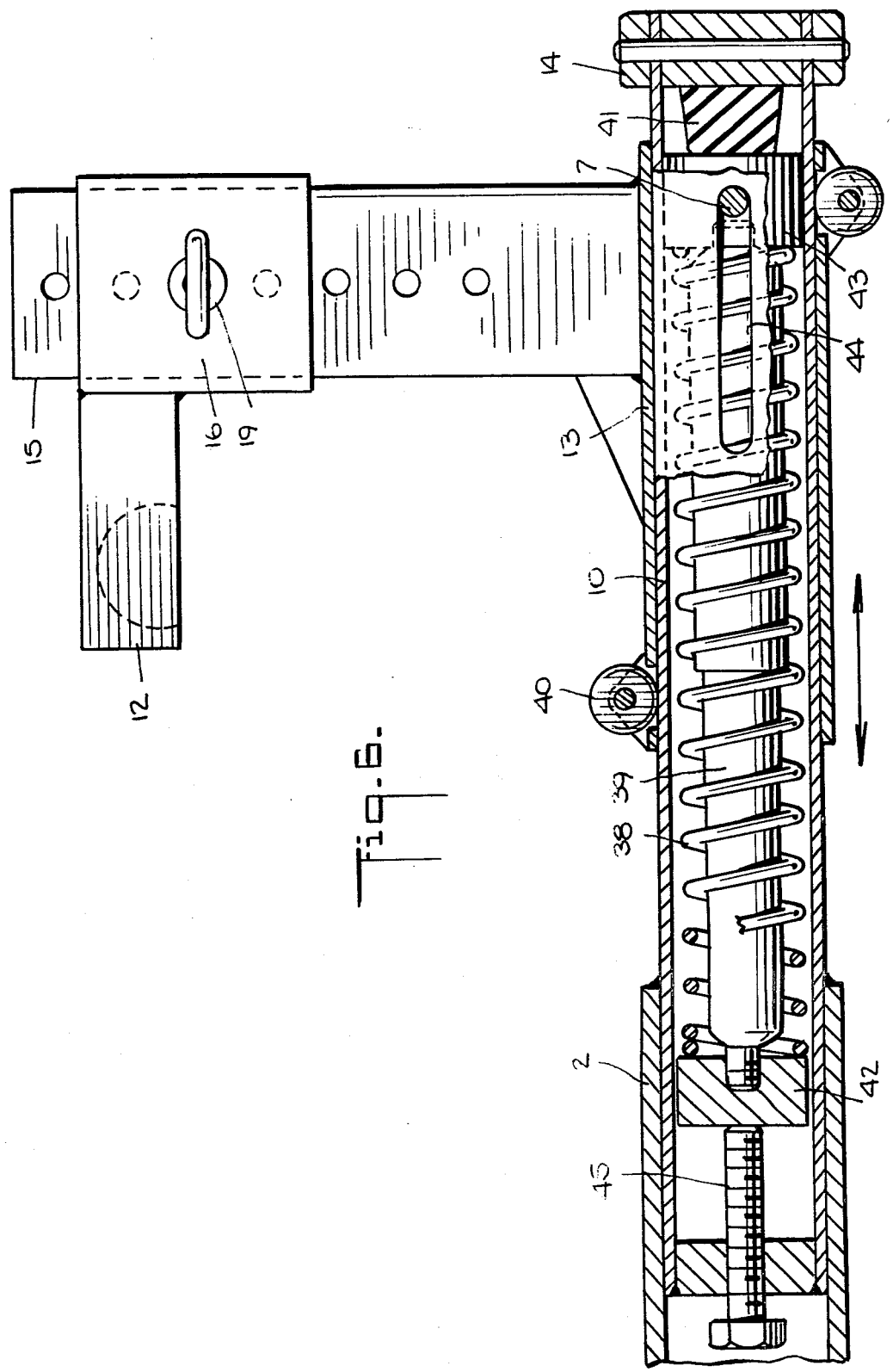

THRUST COUPLING FOR A VEHICLE

This invention relates to a thrust coupling for a vehicle. More particularly, this invention relates to a thrust coupling for attachment to a motor vehicle for coupling a snow plow blade or the like to the vehicle.

As is known, in order to provide a motor vehicle with a front working element such as a snow plow blade, scraper blade or sweeping brush, a connection is required which has certain performance characteristics. For example, the connection must be able to transmit high thrust forces in the travel direction and must be capable of absorbing at least a part of the lateral forces. In addition, the connection must allow the working element to adapt to a roadway independent of the movements of the vehicle. Further, the connection must permit the working element to be lifted off the roadway when the vehicle is in reverse or when the vehicle is being driven without need for the working activity. Finally, the connection should be one which permits coupling and uncoupling from the vehicle with few manipulations.

Generally, vehicles which are to be used with a front working element require a thrust coupling between the element and the vehicle. Such a thrust coupling is usually attached to the chassis of the vehicle and protrudes via a coupling plate provided with bores beyond the front of the vehicle. However, this involves an expensive special attachment which must be specially developed for each vehicle type and which, as a rule, remains at the front of the vehicle as permanent equipment much like a rear trailer coupling. Since major forces, especially impact forces, must be transmitted to the vehicle, the thrust coupling cannot be simply applied, for example to the chassis ends, let alone only to a bumper. For uniform transmission of the forces, extensions are usually necessary which can be anchored at the rear portions of the vehicle, for example as described in German Pat. DE-Al No. 225 6719. Furthermore, when moving backward and also when moving forward without work activity, the front working element must be lifted and lowered by a hoisting mechanism which is controlled by the driver. For this purpose, the known devices have utilized a parallel guide linkage between the coupling plate on the vehicle and the attached working element with the linkage being moved by a hydraulically or pneumatically operated pressure cylinder.

The mounting of the working elements have, however, required expensive instrumentation on the vehicle while presupposing that the chassis of the vehicle is suitable for mounting of the working element. For example, a self-supporting steel plate body of a passenger car or light truck as is customary today is not very suitable. Also, it is not desirable to have a permanent front attachment on a passenger car which is used to clear snow away only a few times during the winter since such an attachment would be aesthetically unpleasant, would entail unnecessary additional weight, would require changes at crumple zones and would impair accessibility when repairs are to be made on the vehicle. In addition, such changes of a vehicle would often be subject to official approval.

In a similar manner, tractors and pulling machines as well as cross-country cars should not be equipped with such expensive front attachments for occassional clearing jobs. For these reasons, the attachment of a thrust coupling for a front working element is customary only on special vehicles. Such vehicles are usually trucks or other heavy duty vehicles which are kept only by commercial businesses or by road construction or by forestry authorities.

Another disadvantage of the known attachments is that the linkage construction requires pivot points for lifting and lowering. Thus, such constructions must be sturdy for the transmission of thrust with a sufficient length and must be diagonally stiffened for transverse forces. This requires additional dead weight and considerable expense.

Accordingly, it is an object of the invention to provide a thrust coupling for a vehicle which is of relatively simple and inexpensive construction.

It is another object of the invention to provide a thrust coupling for a front working element for a vehicle which can be readily attached to the vehicle.

It is another object of the invention to provide a thrust coupling for a vehicle which can be easily coupled to and uncoupled from a motor vehicle.

It is another object of the invention to provide a thrust frame which can be easily adjusted when in use in a vertical plane.

It is another object of the invention to provide a thrust coupling which can be readily adjusted to fit onto different vehicles.

It is another object of the invention to provide a thrust coupling which can be easily fitted to the underside of a vehicle.

Briefly, the invention provides a thrust coupling for a vehicle having a support frame and a hitching device at the rear of the support frame. The coupling is comprised of a thrust frame for disposition under the support frame of the vehicle, a means at the rear end of the thrust frame for suspending the thrust frame from the hitching device of the vehicle and means at a front end of the thrust frame for movably securing the thrust frame to the vehicle support frame. This latter means includes a cable line for attachment to the vehicle support frame and a transverse guide rod which is secured at one end to the thrust frame and which is adapted to be secured at the opposite end to the vehicle support frame.

The mounting of the thrust coupling is such that the thrust frame can be vertically moved while also being horizontally "steered". Also, slight rotational movements along the longitudinal axis are also possible.

Preferably, the thrust frame is divisible approximately in the center. To this end, the thrust frame includes a forward frame part and a rear frame part which are pivotally secured to each other so as to move between a folded together storage position and an extended position. Each frame part includes a pair of stringers which are disposed in overlapping relation and which are connected via cross bolts in order to secure the frame parts in a rigid relation.

The stringers may also be provided with a plurality of bores so that the length of the frame can be adjusted relative to the vehicle length.

The means at the rear end of the thrust frame includes a pivotally mounted arm for movement between a vertical position and a horizontal position as well as a counter-piece which is mounted on the arm for engaging the hitching device. The mounting of the arm is such that the arm can be pivoted laterally or backwardly so that the vehicle can run over the thrust frame without being hindered, for example when uncoupling the thrust frame from the vehicle. Likewise, the counter-piece is adjustable along the length of the arm and can be locked in place by a suitable locking mechanism. This also permits the thrust frame to be adapted to different heights of the hitching device of a vehicle.

The thrust frame may also be provided with adjustable end stops for abutting against the underside of the vehicle support frame in a fully raised position.

The means at the front end of the thrust frame includes actuating means which are connected to the chain line for raising and lowering the thrust frame relative to the vehicle support frame. Such an adjusting means may be hydraulically or pneumatically operated. In this case, the chain line is suspended from the support frame of the vehicle with actuation of the adjusting means being carried out from the driver's seat of the vehicle.

The adjusting means for raising and lowering a thrust frame may also include a means for tensioning the cable line. Such a means may include a spring which is attached to the cable line, a threaded spindle which is secured to the spring and rotatably mounted in the thrust frame and a crank for rotating the spindle, for example, manually. In this way, the required motor force, for example where an electric motor is used to lift and lower the thrust frame, can be reduced.

The means at the rear end of the thrust frame may also include a shaft upon which the arm for the counter-piece is slidably mounted as well as a spring within the shaft for biasing the arm in the longitudinal direction. A shock absorber may also be disposed within the shaft to limit the extension of the spring in the longitudinal direction. Likewise, the arm may be mounted on a sleeve in order to be slidably mounted on the shaft while rollers are rollably mounted on the sleeve to roll on the shaft.

These and other objects and advantages of the invention will become more apparent from the following detailed description taken in conjunction with the accompanying drawings wherein:

FIG. 1 illustrates a perspective view of a thrust coupling constructed in accordance with the invention with a snow plow blade mounted thereon;

FIG. 2 illustrates a view of the rear end of the thrust frame in accordance with the invention;

FIG. 3 illustrates a top view of the front end of the thrust frame of FIG. 1;

FIG. 6 illustrates a part cross-sectional view of the rear end of the thrust coupling in accordance with the invention.

Figure 4:
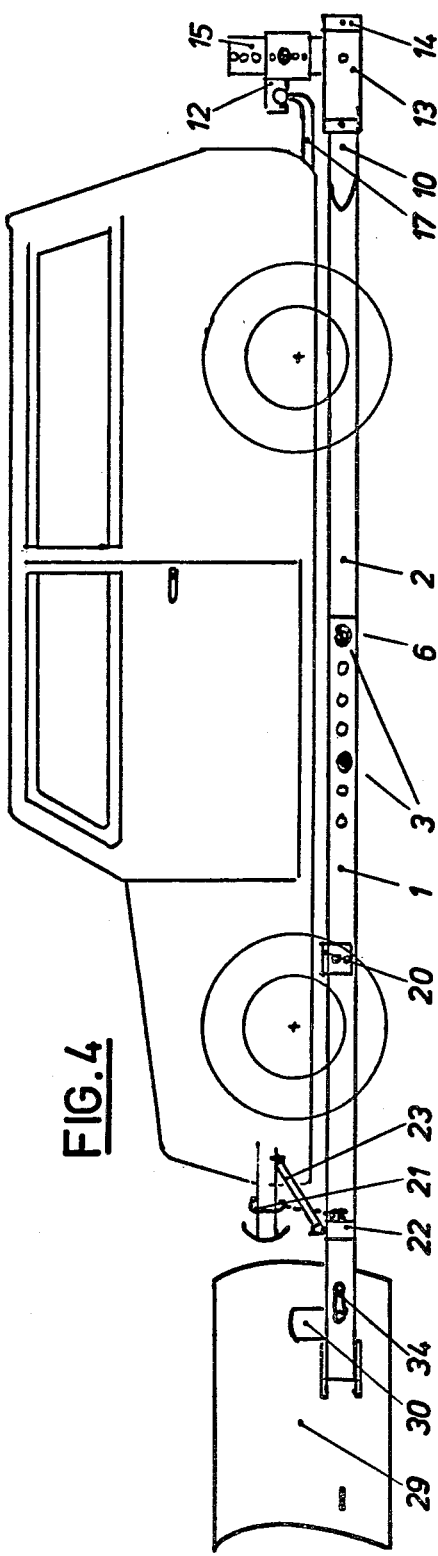
FIG. 4 illustrates a side view of a thrust coupling mounted on a motor vehicle having a rear hitching device in accordance with the invention.
Figure 5:
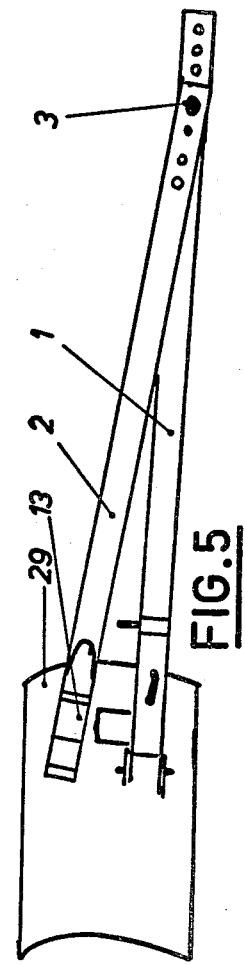
FIG. 5 illustrates the thrust frame in a folded position for storage.

Referring to FIG. 1, the thrust coupling consists of a two-part frame, namely a forward frame part 1 and a rear frame part 2. The forward frame part 1 has a pair of parallel stringers each of which is provided with a plurality of longitudinally disposed bores. The rear frame part 2 has a pair of stringers 5 which converge backwardy towards the rear of the thrust coupling. The stringers 4, 5 of the frame parts 1, 2 are disposed in overlapping relation as shown and are secured together by two pairs of cross bolts 3 which pass through suitable bores in the stringers 4, 5. Depending upon the length of the vehicle to which the thrust coupling is to be attached, the frame parts 1,2 can be adjusted longitudinally relative to each other by positioning the bolts 3 in different bores within the forward frame part 1. In addition, by removing the rear set of bolts 6, the rear frame portion 2 can be pivoted over onto the forward frame part 1 (see FIG. 5). Thus, the rear frame part 2 is able to move between a folded together storage position (FIG. 5) and an extended position (FIG. 1) in parallel with the forward frame part.

The stringers 4 are made from suitable sectional bars or pipes with sufficient mechanical strength against horizontal flexing. In addition, cross stays 9 are fastened across the stringers 4, 5 to stiffen the respective frame parts 1, 2.

The stringers 5 of the rear frame converge to a point and terminate at a round end pipe 10 which serves to carry a means at the rear end of the thrust frame for suspending the thrust frame from a hitching device 17 of the vehicle.

Referring to FIGS. 1 and 6, the means at the rear end of the thrust frame for suspending the thrust frame includes a sleeve 13 which is slidably mounted on the pipe 10 and is of a diameter to slide easily over the thinner pipe 10. In addition, an arm 15 is secured to the pipe 13, as by welding while a counter piece 12 is adjustably mounted on the arm 12 for engaging the hitching device 17 (see FIG. 1). The arm 15 is in the form of a square pipe which can be suitably shaped and secured to the pipe 13 while the counter-piece 12 includes a somewhat larger pipe 16 slipped over the arm 15. As indicated in FIG. 6, the pipe 16 of the counter-piece 12 is provided with a bore while the pipe 15 of the arm 12 is provided with a row of bores to permit the insertion of a bolt 19 by which the counter-piece 12 can be adjusted along the arm 12. This permits the height of the counter pieces 12 to be adjusted to the particular vehicle to which the thrust coupling is to be attached.

In like manner, the sleeve 13 is provided with a bore, the pipe 10 is provided with an elongated slot 44 and a crossbolt 7 is provided to pass into the bore of the sleeve 13 and the slot 44 of the pipe 10 so as to fix the arm 15 in a vertical position. Removal of the bolt 7 permits the arm 12 to be pivoted into a horizontal position (FIG. 2).

As shown in FIG. 6, a compression spring 38 is disposed within the pipe 10 for biasing the arm 15 in a longitudinal direction. The spring 38 is mounted between two sliders 42, 43. The foremost or front slider 42 is adjusted lengthwise by a set screw 45 which is rotatably mounted in a suitable block fixed to and within the hollow pipe 10. The rear slider 43 includes a bore which receives the cross bolt 7. Thus, when the arm 15 is in the extended position and retained in place by the cross bolt 7, the set screw 45 can be turned so as to adjust the tension in the spring 38.

In addition, a shock absorber 41 is disposed within the the pipe 10 to limit the extension of the spring 38. As indicated, the shock absorber 41 is secured to a plate 14 at the rear of the pipe 10.

The slot 44 which is provided in the pipe 10 is as long as the spring path. Thus, at an increasing thrust or sudden impact load, the counter piece 12 is displaced parallel to the axis of the pipe 10 and the spring 38 is thereby tensioned. If the load abates or ceases suddenly, the motion is absorbed by the shock absorber 41 as the spring 38 is pushed back.

Of note, the plate 14 on the pipe 10 also serves as a rear abuttment for the sleeve 13 so as to limit rearward movement.

So that the larger sleeve 13 will not jam on the pipe 10 under load, a pair of supporting rollers 40 are mounted on the sleeve 13 so as to rollably mount the sleeve 13 on the pipe 10 thereby reducing friction.

The thrust frame is also provided with adjustable end stops 20, for example on the forward frame part 1 for abutting against the vehicle support frame in a fully raised position. These end stops 40 may be secured, for example by a clamping screw.

Referring to FIGS. 1 and 3, the front frame part 1 is provided with a cross member 22 which is located, for instance, in the region below the front bumper of the vehicle. In addition, the cross member 22 carries a short front piece 27 of triangular shape. This front piece 27 supports a mount 28 at the apex for a front working element such as a snow plow blade 29.

A means is also provided at the front end of the thrust frame for movably securing the thrust frame to the vehicle support frame. This means includes a transverse guide rod 23 which is secured at one end to the cross member 22 and at the opposite end to the vehicle support frame 32. As the exact centering of the thrust frame depends on the length of the transverse guide rod 23 or the position of the point of attachment to the support frame 32, one end of the guide rod 23 is provided with a threaded spindle 25 by which the length of the guide rod 23 can be adjusted exactly (see FIG. 3).

In addition, the means for securing the thrust frame to the support frame 32 includes a cable line 31 for two cables. The cable line 31 is secured to a motor 30 which is carried on the front piece 27 while the cables 36 are guided over rollers 26 mounted on the cross member 22 and extend to hooks 21 which fit over the support frame 32 such that the cables 36 are suspended from the support frame 32. Actuation of the motor 30 causes the cable line to wind or unwind, depending upon the direction of the motor 30, so as to raise or lower the thrust frame relative to the vehicle support frame 32.

As indicated in FIG. 3, the rollers 26 are located, one on the outside of each stringer 4 and two on the inside of the stringers 4.

A means for tensioning the cable line is also provided on the front part 27. As indicated in FIG. 3, this means includes a pair of extension springs 35 which are connected to the respective cables 36, a threaded spindle 37 which is secured to the springs 35 via a suitable yoke and rotatably mounted in the front piece 27 and a hand crank 34 which is secured to the spindle 37. By turning the hand crank 34, the tension in the springs 35 can be varied. For example, by increasing the tension in the springs 35, the required motor force for lifting the thrust frame can be reduced.

Various embodiments may be made in the thrust frame. For example, the spring 38 and shock absorber 41 may be provided at the level of the coupling to the hitching device 17 so that only the counter-piece 12 is displaced relative to the arm 15 when a sudden impact occurs.

The invention thus provides a thrust frame of relatively simple construction which can be readily coupled to and uncoupled from a vehicle. Further, the invention provides a way of attaching front end working elements to a vehicle equipped with a hitching device without requiring expensive front end attachments.

Another advantage of the thrust frame is that expensive parallel-guiding links are not required to insure parallel lift-off from a roadway since this effect results through the pivot point of the thrust frame on the hitching device and the relatively long length of the thrust frame.

Further, the invention provides a thrust coupling which can be adapted without difficulty to different vehicle types via the various adjustable parts. Additionally, because of the articulated attachment at the rear of a vehicle, the lifting of a front end working element can be accomplished with a minimum of components while the transmission of thrust to a roadway plane is performed at an especially favorable angle.

Still further, the coupling and uncoupling of the thrust coupling to a vehicle can be carried out solely by the driver of the vehicle.

Of note, for a short vehicle, a front attachment of a snow plow is not possible or is impractical because of the pitching motion of such a vehicle. However, since the thrust coupling provides a relatively long push rod, such vehicle motions do not interfere with the position of the front working element. Thus, the thrust coupling can be readily coupled to a short vehicle.

What is claimed is:

1. A thrust coupling for a vehicle having a support frame and a hitching device at a rear of the support frame, said coupling comprising
   a thrust frame for disposition under the support frame of the vehicle;
   means at a rear end of said thrust frame for suspending said thrust frame from the hitching device of the vehicle; and
   means at a front end of said thrust frame for movably securing said thrust frame to the vehicle support frame, said latter means including a cable line for attachment to the vehicle support frame and a transverse guide rod secured at one end to said thrust frame and adapted to be secured at an opposite end to the vehicle support frame.

2. A thrust coupling as set forth in claim 1 wherein said thrust frame includes a forward frame part and a rear frame part pivotally secured to said forward frame part to move between a folded together storage position with said forward frame part and an extended position in parallel with said forward frame part.

3. A thrust coupling as set forth in claim 2 wherein each frame part includes a pair of longitudinally disposed stringers disposed in overlapping relation with said pair of stringers of the other frame part and a plurality of cross bolts passing through said stringers in said extended position to secure said frame parts in rigid relation.

4. A thrust coupling as set forth in claim 3 wherein at least some of said stringers have a plurality of longitudinally disposed bores for receiving said bolts, said bores being disposed to permit longitudinally adjustment of said frame parts relative to each other.

5. A thrust coupling as set forth in claim 1 wherein said means at said rear end of said thrust frame includes a pivotally mounted arm for movement between a vertical position and a horizontal position and a counter-piece mounted on said arm for engaging the hitching device.

6. A thrust coupling as set forth in claim 5 wherein said counterpiece is adjustable along said arm.

7. A thrust coupling as set forth in claim 1 wherein said guide rod is longitudinally adjustable.

8. A thrust coupling as set forth in claim 1 wherein said thrust frame includes adjustable end stops for abutting against the vehicle support frame in a fully raised position.

9. A thrust coupling as set forth in claim 1 wherein said means at said front end includes actuating means connected to said chain line for raising and lowering said thrust frame relative to the vehicle support frame.

10. A thrust coupling as set forth in claim 9 wherein said actuating means is hydraulically operated.

11. A thrust coupling as set forth in claim 9 which further comprises a spring attached to said cable line, a threaded spindle secured to said spring and rotatably mounted in said thrust frame for a crank for rotating said spindle.

12. A thrust coupling as set forth in claim 5 wherein said means at said rear end includes a shaft having said arm slidably mounted thereon and a spring within said shaft for biasing said arm in a longitudinal direction.

13. A thrust coupling as set forth in claim 12 wherein said means at said rear end further includes a shock absorber disposed to limit an extension of said spring.

14. A thrust coupling as set forth in claim 12 which further includes an adjusting means for adjusting said spring to vary the spring force thereof.

15. A thrust coupling as set forth in claim 12 wherein said arm includes a sleeve slidably mounted on said shaft and which further comprises rollers rollably mounting said sleeve on said shaft.

16. In combination with a vehicle having a support frame and a hitching device at a rear of said support frame, a thrust coupling for mounting a front working element at a front end of said vehicle, said thrust coupling comprising a thrust frame disposed under said support frame;
means at a rear end of said thrust frame for suspending said thrust frame from said hitching device; and
means at a front end of said thrust frame for movably securing said thrust frame to said support frame, said latter means including at least one cable line suspending said thrust frame from said support frame and a transverse guide rod secured at one end to said thrust frame at an opposite end to said support frame.

17. The combination as set forth in claim 16 wherein said means at said front end includes actuating means connected to said chain line for raising and lowering said thrust frame relative to said support frame.

18. The combination as set forth in claim 17 which further comprises means for tensioning said cable line.

19. The combination as set forth in claim 16 wherein said means at said rear end of said thrust frame includes a shaft, an arm slidably mounted on said shaft and extending transversely of said shaft, and a counter-piece adjustably mounted along said arm and engaging with said hitching device.

20. The combination as set forth in claim 16 which further comprises a snow plow blade mounted on said front end of said thrust frame.

* * * * *